United States Patent [19]

Landell et al.

[11] Patent Number: 4,994,983
[45] Date of Patent: Feb. 19, 1991

[54] AUTOMATIC SPEECH RECOGNITION SYSTEM USING SEED TEMPLATES

[75] Inventors: Blakely P. Landell, Burlington, N.J.; Robert E. Wohlford, Kildeer, Ill.; Lawrence G. Bahler, San Diego, Calif.

[73] Assignee: ITT Corporation, New York, N.Y.

[21] Appl. No.: 346,054

[22] Filed: May 2, 1989

[51] Int. Cl.⁵ .............................................. G10L 5/00
[52] U.S. Cl. ................................... 364/513.5; 381/43
[58] Field of Search ........................ 364/513.5; 381/43

[56] References Cited

U.S. PATENT DOCUMENTS 4,481,593 11/1984 Bahler ............................. 364/513.5

Primary Examiner—Emanuel S. Kemeny
Attorney, Agent, or Firm—Arthur L. Plevy

[57] ABSTRACT

An automatic speech recognition system has a multi-mode training capability using a set of previously stored templates of a limited number of predetermined seed words to train the templates for a vocabulary of words. The training speech samples each includes a vocabulary word juxtaposed with a seed word. An averager module maintains an active average template for each of the word units of the training speech samples including the seed word units, and the active average templates are used to continuously update the seed template set as they are used in the training speech samples. The preferred training procedure employs training phrases each having a vocabulary word embedded between two seed words, and two seed template sets are used in succession, the first being composed of single-digit words, and the second composed of carrier words.

14 Claims, 2 Drawing Sheets

AUTOMATIC SPEECH RECOGNITION SYSTEM USING SEED TEMPLATES

FIELD OF INVENTION

The present invention relates to a method and apparatus for automatic speech recognition, and particularly, to the use of seed templates in automatic speech recognition training procedures.

BACKGROUND OF INVENTION

Conventional automatic speech recognition systems transform input signals representing speech utterances into discrete representations which are compared to stored representations and "recognized" using statistical matching techniques. In a typical system, as illustrated in FIG. 1, the input signal is filtered and digitized as a series of speech signal samples. The digitized signal samples are then converted into frames of speech data for successive short time segments, including, for example, amplitude values, fundamental and resonant frequencies, spectral energy, frequency spectrum distribution and shape, etc.

The converted frames of speech data are stored and then processed in accordance with selected methods for extracting speech features and parameters. In most presently used systems, the endpoints between words or utterance units are detected and selected speech parameters of each word unit are extracted. The extracted parameters of the word unit are then compared by statistical pattern matching to the parameters of stored templates of a reference dictionary of word units. The differences between the parameters of the input word unit and the stored templates are statistically analyzed, and an acceptably close match or a list of possible close matches is selected by decision rules. The difficult problem of producing accurate word recognition output from the results of the template matching process quickly and reliably and, further, of interpreting a correct meaning of the recognized words in order to obtain a machine response, are currently being addressed through high-level linguistic analyses of prosodics, syntax, semantics, and pragmatics of the words, phrases, and sentences of speech input.

The stored dictionary of templates in conventional systems is created and/or updated for new words using a training procedure in which a speaker pronounces each word a number of times, and a training module generates corresponding templates representing weighted averages of the relevant template parameters of the pronounced words. Systems used for different tasks may employ different vocabularies, i.e. different word sets expected to be recognized by the system. Speaker-dependent systems store different dictionaries for different speakers because of the wide variations in pronunciation and speech syntax from speaker to speaker. Recognition systems are also operated in different modes, i.e. speaker-dependent, independent, isolated word, or continuous speech recognition. As a result, a wide variety of different recognition systems have been developed and different training procedures are employed in each system depending upon the application, speaker(s), and/or operational mode.

SUMMARY OF INVENTION

In order to overcome the disadvantages of present automatic speech recognition systems, it is a principal object of the invention to provide a recognition system having a common training procedure which can be used to train the system for a number of different applications, speakers, and operational modes.

In accordance with the invention, an automatic speech recognition system having a multi-mode vocabulary training capability includes: an extractor for extracting identifiable parameters for each of a series of word units of an input speech sample; a dictionary storage for storing templates of parameters corresponding to respective word units to be recognized by the system; a recognition module for comparing the parameters of each word unit of an input speech sample, as extracted by the extractor, to the parameters of their corresponding templates and outputting recognition data indicating a match with their respective templates; a seed template set having previously stored templates of parameters for a limited number of predetermined seed word units; a training token input for providing training speech samples for training each word unit template to be stored in the dictionary storage, wherein each training speech sample includes a dictionary word unit juxtaposed with a seed word unit; an averager module connected to the recognition module for averaging the template parameters of the word units of the training speech samples and generating a corresponding template for each dictionary word unit to be stored in the dictionary storage, wherein said averager module maintains an active average template for each of the word units of the training speech samples including the seed word units, and the active average templates for the seed word units are used to continuously update the seed template set when the respective seed word units are used in the training speech samples; and a control module for operating the above-identified training components of the automatic speech recognition system such that the parameters of the continuously updated seed template set are used to generate the templates for the dictionary word units.

In accordance with a further aspect of the invention, the training procedure employs training speech samples consisting of a dictionary word unit bracketed on each side by a seed word unit. As the seed word templates are continuously updated, the extractor and recognition modules can more accurately identify the endpoints and syntax of the dictionary word unit bracketed in each training speech sample. The word units of the seed template set are selected to be usable in a wide range of applications and operational modes, and as being readily recognizable despite differences in pronunciation by a speaker or from speaker to speaker. Thus, the same system training configuration and training procedure can be used for a wide range of system applications, speakers, and dependent/independent or isolated/continuous recognition modes. In the preferred form of the invention, two seed template sets are used in succession, the first being composed of single-digit words, and the second composed of carrier words having alternate types of phoneme suffixes and prefixes.

BRIEF DESCRIPTION OF DRAWINGS

The above objects and further features and advantages of the invention are described in detail below in conjunction with the drawings, of which.

DETAILED DESCRIPTION OF INVENTION

Figure 1:
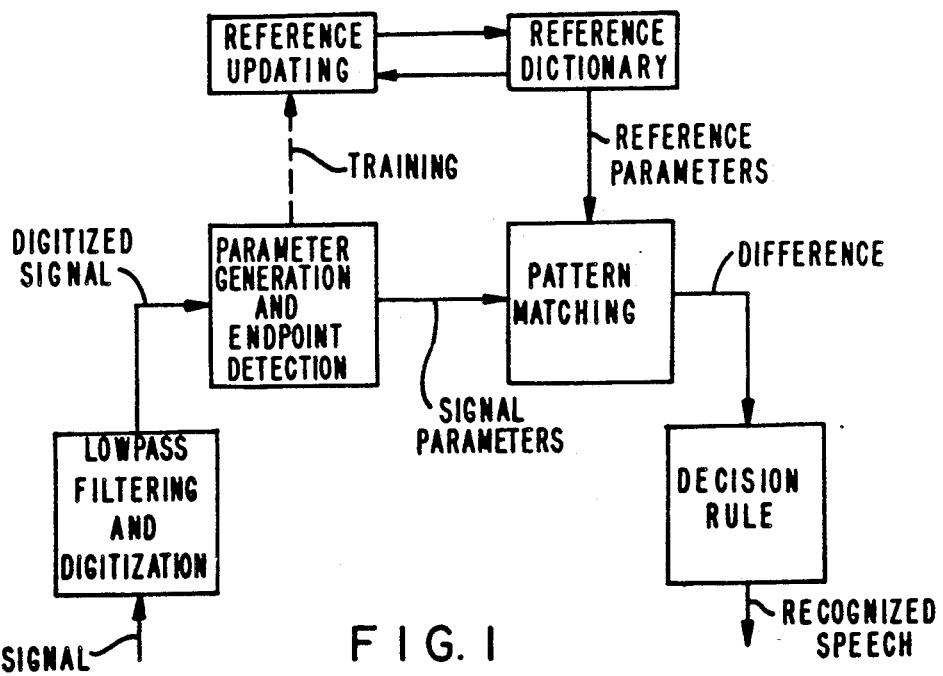
FIG. 1 is a block diagram of the general functional elements of a conventional automatic speech recognition system.
Figure 2:
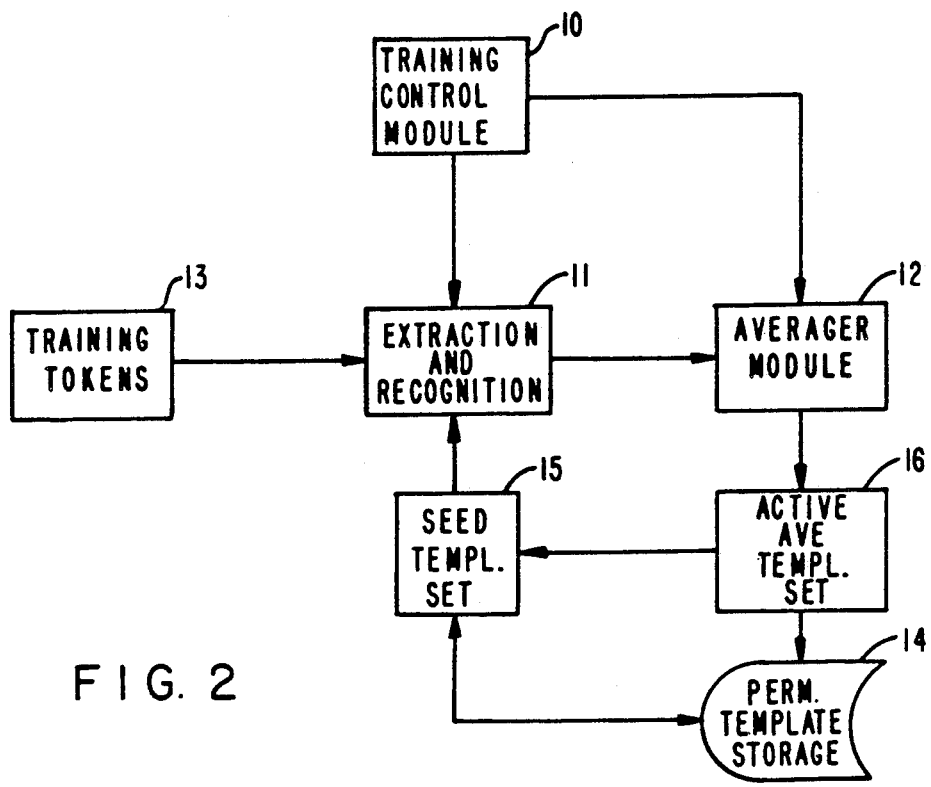
FIG. 2 is a block diagram of an automatic speech recognition system employing a multi-mode training module and procedure in accordance with the invention.

The present invention encompasses the known functional elements of an automatic speech recognition system of the pattern-matching type as shown in FIG. 1, and employs the specific training configuration for a word-based recognition system as schematically illustrated in FIG. 2. The word-based training procedure used in the invention is shown schematically in FIG. 3. However, the principles of the invention are deemed to be applicable to a wide range of recognition system types and are not limited to word-based recognition systems alone.

In essence, a training subsystem for a speech recognition system stores templates of a seed word set of short, widely-used, and easily recognized words, such as the one-syllable digits, ONE, TWO, THREE, etc. During a training sequence, the seed word set is updated for the current speaker and/or environment by inputting training samples using the seed words, from which template parameters are extracted and used to update the stored seed word templates. Next in the training sequence, the system vocabulary is trained for the words that are to be recognized in the application mode of the system. For each training sample, a phrase consisting of a vocabulary word bracketed between two seed words, e.g. ONE-EXECUTE-TWO, is entered one or more times. Since the seed word parameters have been well-established, a good template of each vocabulary word can be obtained because the recognizer module can more accurately identify the endpoints and syntax of the vocabulary word when it is bracketed between the known seed words. The extracted template parameters for the vocabulary words are stored in a dictionary which the system uses to recognize input words during its application mode. Active average templates for the vocabulary words are maintained when the training samples are repeated a number of times. Active average templates are also maintained for the seed words so that the seed template set can be continuously updated with each training input sample. Training the vocabulary words bracketed by the known seed words, and continuously updating the seed template set with each training sequence or sample increase the reliability of the vocabulary templates and keep the system up-to-date with whoever the current speaker is, whatever background pervades the current environment (noise, etc.) and/or whatever conditions exist in the current application (pronounciation, stresses, speaking speed, etc.). Thus, the invention implements a versatile training capability for an automatic speech recognition system which can be operated in multiple modes, including continuous speech recognition, speaker verification, wordspotting, isolated word recognition, and speaker recognition, and for multiple applications.

For a wider, more detailed explanation of speech recognition systems, the following are incorporated herein by reference: "Speaker Identification and Verification Combined With Speaker Independent Word Recognition", by A. E. Rosenberg and K. L. Shipley, Proceedings of the 1981 IEEE International Conference on Acoustics, Speech and Signal Processing (ICASSP); "On Creating Reference Templates for Speaker Independent Recognition of Isolated Words, by L. R. Rabiner, IEEE Transactions on Acoustics, Speech and Signal Processing; "Long-Term Feature Averaging for Speaker Recognition", by J. D. Markel, B. T. Oshika, and A. H. Gray, Jr., IEEE Transactions on Acoustics, Speech and Signal Processing, vol. 25, pp. 330–337 (1977); "A Comparison of Four Techniques for Automatic speaker Recognition", by R. E. Wohlford, R. E. Wrench, and B. P. Landell, Proc. 1980 IEEE ICASSP, vol. 3, pp. 908–911; "A Realtime Implementation of a Text Independent Speaker Recognition System", by E. H. Wrench, Proc. 1981 IEEE ICASSP, vol. 1, pp. 193-196; U.S. Pat. No. 4,720,863 issued Jan. 19, 1988, to K. P. Li and E. H. Wrench; and U.S. Pat. No. 4,481,593 issued Nov. 6, 1984, to L. Bahler.

The above references describe conventional elements of and techniques for speech recognition systems, e.g., the digitizer, template parameter generator, recognizer (pattern matching) module, reference dictionary of templates, updating (averager) module, and decision module shown in FIG. 1. These known elements are used in the present invention in a conventional manner, and are therefore not described in further detail herein. However, the essence of the invention is directed to a unique training technique and subsystem which is used in conventional speech recognition systems, as described further below.

Referring to FIG. 2, a training configuration for an automatic speech recognition system includes a training control module 10, a parameter extraction and recognition (hereinafter "recognizer") module 11, an averager module 12, a training token input 13, and a permanent template storage 14. The training token module 10 provides the command sequence to the recognizer module 11 and averager module 12 for processing a training "script" of training speech samples ("token") supplied from input 13 in order to produce the word templates for the trained vocabulary (reference dictionary) for the speech recognition system that is stored in permanent storage 14. The training tokens are supplied a number of times, i.e. iteratively, for each word to be trained, and the averager module maintains an active average of the repeated tokens for each word in an active average template module 16. After a selected count of repeated tokens, the final averages of the active average template set are stored as the word templates for the trained vocabulary.

Prior to a training session for a selected application and/or speaker, a previously stored, standard or common "seed" template set is loaded in the seed template module 15. The parameters of the initially-loaded seed template set are used by the averager module to initialize the active average template set 16. Training tokens of the seed template words spoken by a particular speaker (i.e. for the speaker-dependent mode) can then be supplied to the recognizer module 11, and the averager module will adjust the active average template with the new training tokens to take into account the pronunciation and syntax of the particular speaker. On each training pass, the seed template set 15 is updated, and the updated set is then employed by the recognizer module.

In accordance with the invention, the initialized or updated seed template set 15 is then used for the training of a specific application and/or speaker vocabulary (hereinafter "dictionary" or "dictionary words"). The training tokens used in the training script are composed of a dictionary word juxtaposed with or, preferably, bracketed by seed words. The recognizer module 11 can more accurately identify the endpoints and syntax of the dictionary words bracketed in each training token by using the previously established parameters of the seed words as provided from the seed template module 15. The presence of the known parameters for the seed words "forces" recognition of the endpoints and speech formant alignment paths of the bracketed dictionary word.

The words of the seed template set are selected to be words that are used in a wide range of applications so that the same standard set of seed words may be used for training many different vocabularies. For the speaker-independent mode of operation, the seed words should also be comparatively easy to recognize despite differences in pronunciation from speaker to speaker. In the preferred form of the invention, two seed template sets are used in succession, the first being composed of single-digit words, i.e. ONE, TWO, THREE, etc., and the second composed of carrier words having alternate types of phoneme suffixes and prefixes, i.e. fricative, plosive, and vowel sounds.

The training procedure preferably includes "open recognition" of the specific vocabulary as well as the above-mentioned forced recognition. Open recognition training tests recognition of the specific vocabulary words as they would be used in the context of their corresponding application (task grammar and syntax). Whenever possible the training data is processed iteratively, by repeating the training script or by multiple passes through stored training tokens.

TRAINING CONTROL

The training control module 10 issues the commands to sequentially process a training script associated with the task vocabulary. Prior to a training session, a seed template set is loaded in the module 15, and the averager module 12 is called to initialize the active average template set from the seed template set and a weight parameter. Input speech samples are prompted according to the script, and a forced recognition syntax will be recognized and averaged to the active average template set for the expected training word bracketed by the seed words. Appropriate flags are set so that the speech alignment paths are stored for the current template sequence. After the recognizer module 11 has been invoked and recognition is completed, a verification routine evaluates the recognition result and, if deemed to be correct, the averager module is called to update the active average template set. An "error" routine is used to handle mispoken or unrecognized training utterances. The seed template set is also updated with the active average template set. The update occurs continuously during the training session, although a provision for "block" updating at the end of a session may be included. At the conclusion of a training session, the updated seed template set is stored in permanent storage.

The recognizer module 11 uses a current template-matching recognition algorithm enhanced to save alignment traceback data for selected templates. The recognizer module outputs the score and sequence of concatenated templates ("labels") which best explain the training utterance, as well as the score and sequence of any forced recognition match. For a forced match, the word endpoints and traceback data are provided for each template.

The averager module 12 maintains an active average template for each word of the task vocabulary being trained. A count register is kept for each template indicating the number of training tokens represented in the active average. The count register is initialized prior to the training session to a value reflecting the desired weight to be accorded to the current seed template parameters, and the active average template set is initialized with the seed template parameters accordingly. Following the recognition of each training token, the template labels, traceback data, and parameters are input to the averager module, and the active average template set is correspondingly updated. The duration of the active average template can be adjusted by linear interpolation.

The training control will employ the set of available seed templates which is deemed to best fit the specific training task. Since different seed template sets may be selected for different applications, or a current seed template set may be used or updated for different speakers and/or different applications, the training system and procedures of the invention can be used in common for multiple applications, speakers, and modes.

For applications that are speaker-dependent and vocabulary-dependent, a seed template set is selected suitable to bootstrap the training of a new speaker on an existing vocabulary or of additional words or updated training for the current speaker. For speaker and vocabulary-independent mode, readily recognizable single-syllable or sub-word seeds are used to bootstrap recognition of a new vocabulary or new words. They may also be employed for text-independent filler template training for wordspotting or speaker recognition. For speaker-dependent, vocabulary-independent mode, speaker-independent template seeds are adapted to training data from a new speaker. The adapted speaker-dependent templates are then used to enhance recognition of a specific script for a new vocabulary or a text-independent sequence. For speaker-independent, vocabulary-dependent mode, a common seed template set is used to train for the specific application syntax, endpoint determination, etc.

The training control is capable of being operated in at least the following modes. In the supervised mode, which is the most common mode of training, both open and forced recognition of a training script is used, and speaker-dependent, vocabulary-dependent type seed templates are employed. The recognizer module 11 outputs a sequence of labels, endpoints and traceback data to the averager module.

In the new-vocabulary mode, speaker-dependent, vocabulary-dependent seed templates are created from speaker-dependent, vocabulary-independent stored seed templates. Prompted training utterances are recognized with open recognition of filler templates. Labels are coalesced so that only the endpoints of the target token need be provided to the averager module since no traceback (alignment) data is required.

In the unsupervised training mode, only open recognition is used. The recognizer outputs the series of template labels which best explain the training utterance along with their endpoints and traceback data. This mode is employed to create speaker-dependent filler templates for wordspotting and speaker recognition using speaker-independent seed templates.

DETAILED TRAINING PROCEDURE

Figure 3:
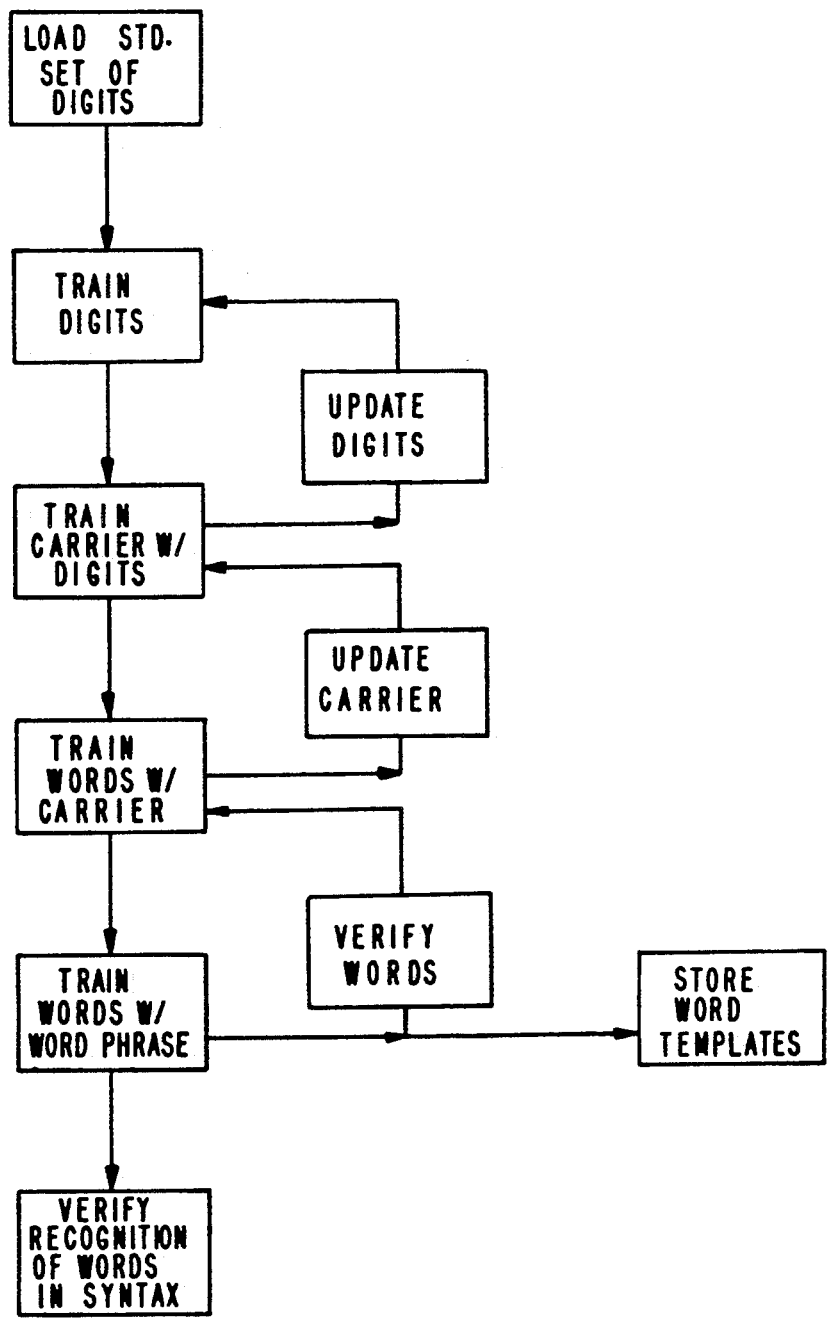
FIG. 3 is a flow diagram of the multi-mode training procedure employed in the invention.

The following is an example of a preferred training procedure implemented using the principles of the invention as explained above. The schematic outline of the training procedure is shown in FIG. 3. In practice, the training procedure was written for an IBM PC-type computer running a Xenix operating system with a standard C shell command interpreter.

There are five basic steps to training the vocabulary templates for an application. They are: (1) digit training; (2) carrier word enrollment and training; (3) application vocabulary enrollment and training using carrier phrases; application vocabulary training using application phrases; and (5) template verification in the application syntax. The first two steps are the same for every supported application. The last three requires the creation of permanent files which are specific to an application. The names used for each of these steps are as follows:

| | |
|---|---|
| digit | digit training |
| carrier | carrier word enrollment/training |
| enroll | application word enrollment/training w/carrier phrases |
| train | application word training using application phrases |
| recog | template verification in the application syntax |

Each of the training steps requires a set of files unique to that step. The nomenclature for the file names is "stepname.extension", where the extensions refer to a parameter file (.param), a syntax file (.syn), a noise file, template files, and a script file (.script) if enrollment or training is to be performed.

The first step in the training procedure is to train a set of speaker-dependent digit templates from a standard set of speaker-independent digit templates provided on the system. Digit words are common to most applications and are therefore used as a standard seed template set. The recommended procedure for this training step is as follows:
reset the recognizer
download:
    parameters, digit.param
    syntax, digit.syn
    training script, digit.script
    templates
calibrate a noise estimate
upload the noise estimate
adjust active average templates
train the digit templates
verify the digit templates
retrain digits if necessary The first step procedure starts by loading the appropriate parameter, syntax, template, and script files. A noise estimate is then calibrated by an automatic routine. After the noise calibration, the training control displays a digit string as a training prompt (e.g., "2, 1, 3, 7, 5"). The speaker speaks the training phrase and waits for a response. If an "open recognition" response is displayed, the phrase was correctly recognized, the digit templates were updated, and the next phrase is displayed. If a "forced recognition" response is displayed, the phrase was not correctly recognized but the system was able to "force" a match of the input speech to the templates. The user is then prompted to respeak the phrase, or to force the match of the spoken phrase and go on to the next phrase. It is recommended that the user respeak the phrase to insure that it was spoken correctly before forcing a template update. If a "recognition failure" or "error" response is displayed, the user is prompted to respeak the phrase.

The above prompt-response sequence continues for each phrase in the training script until it is completed. At that time, the updated digit templates are stored, then the recognition mode is entered and a verification routine is performed. Verification involves speaking digits randomly, e.g. ONE, NINE, ZERO, and verifying the results. If a significant number of recognition errors occurs, the digit templates should be retrained until good recognition is obtained.

The second step in the training procedure is to generate a set of speaker-dependent carrier word templates, e.g. PLEASE, SPEAK, SAY, AGAIN. The carrier templates are enrolled by embedding each carrier word between two well-trained digit words which will serve as beginning and ending boundaries for the word being enrolled. The recommended procedure for this training step is as follows:
reset the recognizer
download:
    parameters, carrier.param
    syntax, carrier.syn
    training script, carrierE.script
    templates
adjust active average templates
enroll the carrier words
download script, carrierT.script
train the carrier templates
upload the carrier word templates
verify the carrier templates
retrain carrier words if necessary After loading the appropriate files, enrollment is invoked, and the training control displays a phrase prompt, e.g. 4 SAY 2, which the user speaks without pausing between words and waits for a recognition or error response. The carrier word training phrases are processed sequentially as above until completed. The recognition mode is then entered and the carrier words are verified by speaking single words and then strings of the carrier words. If the carrier words are recognized successfully, the enrollment and training is completed.

Enrollment and training of application-dependent vocabulary words is the next training step Each of the application vocabulary words are enrolled while embedded between two carrier words, e.g. SAY <WORD> AGAIN. Every vocabulary words is enrolled between two different sets of carrier words, in order to provide representations of each word in different contexts which are averaged together. A carrier word ending with a hard or plosive sound should precede a vocabulary word starting with a vowel or soft consonant sound, and vice versa. Similarly, a carrier word starting with a hard or plosive sound should follow a vocabulary word ending with a vowel or soft consonant sound. The recommended procedure is as follows:
reset the recognizer
download:
    parameters, enroll.param
    syntax, enroll.syn
    training script, enrollE.script
    noise
    templates
adjust active average templates
enroll the vocabulary words download script, enrollT.script
train the vocabulary templates
upload the vocabulary word templates
verify the vocabulary word templates
retrain vocabulary words if necessary After loading the appropriate files, each vocabulary word is displayed between two carrier words as an enrollment prompt. While training these words, the words which will not produce an open recognition (i.e. require a forced recognition) should be noted. During verification, each word on the "forced update" list should be verified by speaking it embedded in different permutations of the carrier words. The words which can be correctly recognized in the different contexts can be verified as having good templates, and the remaining should be re-enrolled.

The fourth step in the training procedure is to train the vocabulary words in application-type phrases. The recommended procedure for application-phrase training is as follows:
reset the recognizer
download:
   parameters, train.param
   syntax, train.syn
   training script, train.script
   noise
   templates
adjust active average templates
train the vocabulary words
upload the vocabulary templates
verify the vocabulary words
retrain vocabulary words if necessary The training control displays application-type phrases using the given vocabulary words. As before, phrases which require a "forced update" should be noted, and verification of all forced words is recommended.

The final step of the training procedure uses the vocabulary words in their application environment in order to correct for any differences between the phrase training syntax and the application syntax. The recommended procedure for this is as follows:
reset the recognizer
download:
   parameters, recog.param
   syntax, recog.syn
   noise
   templates
adjust active average templates
perform recognition In this step, application phrases are spoken and the results are observed. The entire vocabulary should be represented in these phrases exercising every legal path in the syntax. If the noise environment is different than that used in training, a noise recalibration may be necessary.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. A training subsystem for an automatic speech recognition system having a training capability for training a vocabulary of words to be recognized by said system, comprising:

a seed template set for maintaining templates of template parameters for a limited set of seed words which are preselected to be short, commonly-used, and easily recognized words;

a training input for providing a training speech sample for training each vocabulary word to be recognized by the automatic speech recognition system, wherein each training speech sample consists of a spoken phrase of a vocabulary word juxtaposed with at least one seed word included in said seed template set;

an extractor for extracting template parameters for each of the words of a training speech sample provided by said training input, wherein said extractor is enabled to extract the template parameters for the vocabulary word of the training speech sample by using the template maintained in said seed template set for the at least one seed word of the training speech sample;

a training control module for controlling said extractor to provide the extracted template parameters for each vocabulary word of the respective training speech samples and for generating corresponding vocabulary word templates;

a dictionary storage for storing the templates for the respective vocabulary words as extracted by said extractor and generated under control of said training control module; and said training control module being operative for controlling said extractor to provide the extracted template parameters for the at least one seed word of the training speech sample and for updating the corresponding seed word template of said seed template set so that the updated seed word template can be used for subsequent training speech samples.

2. A training subsystem for an automatic speech recognition system according to claim 1, wherein each training speech sample provided by said training input is composed of a vocabulary word bracketed on each side by a seed word of said seed template set.

3. A training subsystem for an automatic speech recognition system according to claim 1, wherein said training control module is operative for training a vocabulary of words for any one of a plurality of applications, speakers, and recognition modes for which the system is used.

4. A training subsystem for an automatic speech recognition system according to claim 1, wherein said training control module includes means for using two seed template sets in succession, the first being composed of seed words which are single-digit words, and the second composed of seed words which are short carrier words having alternate types of phoneme suffixes and prefixes.

5. A training subsystem for an automatic speech recognition system according to claim 4, wherein said training control module includes means for commanding a training procedure of training the templates for the single-digit words as a first seed template set, training the templates for the carrier words as a second seed template set using the first seed template set of digit words as the maintained seed template set, then training the vocabulary words using the second seed template set of carrier words as the maintained seed template set.

6. A training subsystem for an automatic speech recognition system according to claim 5, wherein said training control module includes means for further commanding the training procedure of training the vocabulary words using phrases composed of the words of a particular application bracketed by the seed words, then verifying recognition of the vocabulary words using phrases composed of the vocabulary words in the syntax of the particular application.

7. A training subsystem for an automatic speech recognition system according to claim 1, further comprising an averager module operative in conjunction with said extractor and said training control module for averaging the template parameters for the words of a training speech sample repeated a plurality of times and for maintaining active average templates corresponding to such words of the training speech sample, wherein said averager module is used to generate averaged templates for the respective vocabulary words and to continuously update active average templates of the seed template set as the respective seed words are used in successive speech training samples.

8. A method for training a vocabulary of words to be recognized by an automatic speech recognition system, comprising the steps of:
maintaining a seed template set of templates of template parameters for a limited set of seed words which are preselected to be short, commonly-used, and easily recognized words;
providing a training speech sample for training each vocabulary word to be recognized by the automatic speech recognition system, wherein each training speech sample consists of a spoken phrase of a vocabulary word juxtaposed with at least one seed word included in said seed template set;
extracting template parameters for each of the words of a training speech sample, wherein extracting the template parameters for the vocabulary word of the training speech sample is enabled by using the template maintained in said seed template set for the at least one seed word of the training speech sample;
using the extracted template parameters for each vocabulary word of the respective training speech samples to generate corresponding vocabulary word templates;
storing the templates for the respective vocabulary words in a dictionary storage to be used by the automatic speech recognition system for recognizing vocabulary words; and
further using the extracted template parameters for the at least one seed word of the respective training speech samples to update the seed word templates of said seed template set so that the updated seed word templates can be used for subsequent training speech samples.

9. A method for training a vocabulary in an automatic speech recognition system according to claim 8, further comprising the step of averaging the template parameters for the words of a training speech sample repeated a plurality of times and maintaining active average templates corresponding to such words of the training speech sample, wherein averaged templates are generated for the respective vocabulary words and active average templates are maintained for the seed template set in order to continuously update the seed template set as the respective seed words are used in successive speech training samples.

10. A method for training a vocabulary in an automatic speech recognition system according to claim 8, wherein each training speech sample is composed of a vocabulary word bracketed on each side by a seed word of the seed template set.

11. A method for training a vocabulary in an automatic speech recognition system according to claim 8, wherein the training method is used to train the vocabulary words for any one of a plurality of applications, speakers, and recognition modes for which the system is used.

12. A method for training a vocabulary in an automatic speech recognition system according to claim 8, wherein said extracting step includes using two seed template sets in succession, the first being composed of seed words which are single-digit words, and the second composed of seed words which are short carrier words having alternate types of phoneme suffixes and prefixes.

13. A method for training a vocabulary in an automatic speech recognition system according to claim 12, wherein said training method includes commanding a training procedure of training the templates for the single-digit words as a first seed template set, training the templates for the carrier words as a second seed template set using the first seed template set of digit words as the maintained seed template set, then training the vocabulary words using the second seed template set of carrier words as the maintained seed template set.

14. A method for training a vocabulary in an automatic speech recognition system according to claim 13, wherein said training method includes further commanding the training procedure of training the vocabulary words using phrases composed of the words of a particular application bracketed by the seed words, then verifying recognition of the vocabulary words using phrases composed of the vocabulary words in the syntax of the particular application.

* * * * *